United States Patent

John et al.

[15] 3,660,016
[45] May 2, 1972

[54] REMOVAL OF CARBON DIOXIDE AND/OR HYDROGEN SULFIDE FROM GASES CONTAINING OLEFINES AND ACETYLENES

[72] Inventors: Harald John; Rolf Luehdemann, both of Ludwigshafen; Wilhelm Rittinger, Schifferstadt; Artur Sliwka, Krichheim; Walter Saum, Ludwigshafen, all of Germany

[73] Assignee: Badische Anilin- & Soda-Fabrik Aktiengesellschaft, Ludwigshafen/Rhine, Germany

[22] Filed: Dec. 16, 1968

[21] Appl. No.: 783,907

[30] Foreign Application Priority Data

Dec. 15, 1967 Germany.....................P 16 43 715.3
Sept. 14, 1968 Germany.....................P 17 94 149.0

[52] U.S. Cl. ...............................................................23/2 R
[51] Int. Cl. .................................B01d 53/34, B01d 53/16

[58] Field of Search...................23/2, 2.3, 3, 3.3, 4

[56] References Cited

UNITED STATES PATENTS 3,042,483  7/1962  Wolfram et al. ..........................23/2 R

*Primary Examiner*—Earl C. Thomas
*Attorney*—Johnston, Root, O'Keeffe, Keil, Thompson & Shurtleff

[57] ABSTRACT

A process for the removal of $CO_2$ and/or $H_2S$ from gases containing olefins and acetylenes by absorption in an aqueous solution of an alkali metal salt of amino acid and desorption by decompressing and heating the solvent, which comprises treating the solvent, before or after desorption, with a hydrocarbon mixture substantially consisting of benzene for the purpose of removing impurities and, after said treatment, separating the hydrocarbon mixture from the aqueous solution.

6 Claims, 1 Drawing Figure

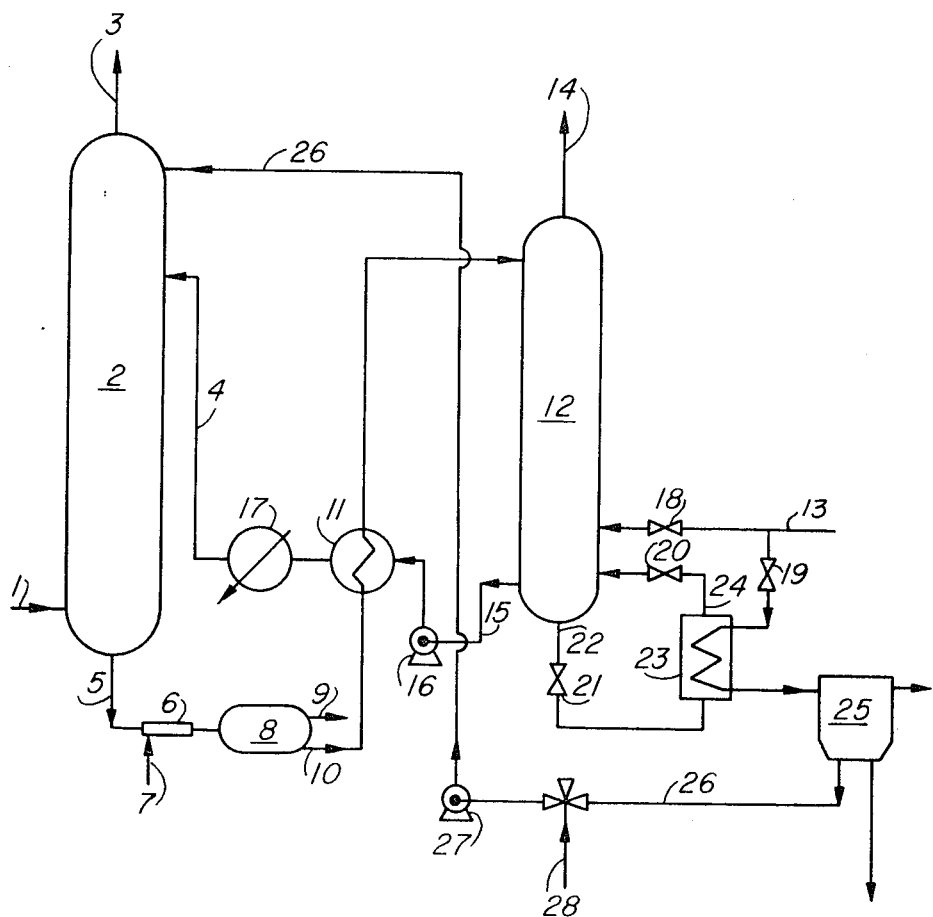
INVENTORS
HARALD JOHN
ROLF LUEHDEMANN
WILHELM RITTINGER
ARTUR SLIWKA
WALTER SAUM

REMOVAL OF CARBON DIOXIDE AND/OR HYDROGEN SULFIDE FROM GASES CONTAINING OLEFINES AND ACETYLENES

The removal of carbon dioxide and hydrogen sulfide from synthesis gas mixtures consisting substantially of carbon dioxide, hydrogen and carbon monoxide, by scrubbing them with aqueous solutions of salts of amino acids is a process that has been practiced in the chemical industries for a long time. Natural gas, converter gas, water gas or gases obtained by the gasification of oils or by the pressure devolatilization of bituminous coal, are examples of gases that can be purified by this process.

Another known process is the removal of $CO_2$ and $H_2S$ from cracked gases obtained when hydrocarbons are cracked to olefins, by scrubbing these gases with a dilute solution of caustic soda. However, difficulties arise because highly viscous polymers collect in the scrubbing liquor from which they must be removed for instance by filtration, separation or by a treatment with water-immiscible organic solvents to permit the caustic soda solution to be more efficiently utilized by repeated recycling. However, this process has the serious drawback that the spent solution of caustic soda must be subjected to a very expensive effluent processing treatment.

The invention concerns a development of the process for the removal of $CO_2$ and/or $H_2S$ from gases containing olefins and acetylenes, which comprises contacting these gases in an absorption zone at a temperature between 20° and 60°C, preferably between 35° and 50°C, at normal or elevated pressure, with an aqueous solution of alkali metal salts of amino acids adjusted to a density at 20° of 1.10 to 1.25, removing the $CO_2$ and/or $H_2S$ from the solution leaving said zone, if desired after previously decompressing the same, by heating the solution in a desorption zone at temperatures between 95° ans 110°C, and then recycling the solution into the absorption zone.

The invention relates to a process of the above specified kind which comprises contacting the aqueous solution of alkali metal salts of amino acids, before it enters and/or after it leaves the desorption zone, with a hydrocarbon mixture substantially consisting of benzene and its homologues and in separating the hydrocarbon mixture from the aqueous solution after this treatment.

The hydrocarbon treatment of the aqueous solution is generally performed at a temperature between 20° and 70°C, preferably between 40° and 70°C.

The new process can be used with particular advantage to the purification of gases that are obtained in the thermal cracking of gasolines, Diesel oils or crude oils at 700° to 950°C, in the presence of absence of steam. Besides relatively small volumes of hydrogen sulfide and $CO_2$, such gases mainly contain olefins, such as ethylene, propylene and butene, hydrogen and methane, acetylene compounds, such as acetylene, methyl acetylene and vinyl acetylene, butadiene and other diolefins.

The scrubbing liquor for separating the $H_2S$ and the $CO_2$ is an aqueous solution of alkali metal salts of amino acids, particularly of the potassium salts of taurine, N-methyl taurine, glycocoll, α-alanine, n-(β-ethoxy) taurine, sarcosine or N-(β-aminoethyl) taurine. The solution of the potassium salt of N-methyl-α-aminopropionic acid has proved to be particularly effective. The salts may be used individually or in admixture. The aqueous solution is adjusted at 20°C to a density of 1.10 to 1.25, particularly 1.15 to 1.20. The quantity of solution to be used depends for instance upon the amount of $H_2S$ and $CO_2$ to be removed, the concentration of these substances in the gas mixture, the desired final purity, the working pressure, the working temperature and the residence time of the gas mixture. The optimum conditions can easily be determined for each particular case.

It was also found that polymerization inhibitors, such as diethyl hydroxylamine, trinonylphenyl phosphite or pyrogallol and particularly alkali metal salts of nitrous acid can be added to the aqueous solution of the alkali salts of amino acids in quantities of from 5 to 5000 ppm, preferably 50 to 500 ppm. The addition of between 10 and 5000 ppm, preferably between 50 and 2000 ppm, of a mixture that is obtained as a residue in the distillation of octanols, nonanols and/or decanols produced by the oxo process, has proved to be advantageous.

This mixture of substances primarily contains ethers, carboxylic esters and ketones that derive from the alcohols. It also contains minor quantities of the alcohols and sodium or potassium salts of the carboxylic acids. Generally this mixture has an acid number between 5 and 40, an ester number between 5 and 40, a ketone number between 1 and 8 and a hydroxyl number between 50 and 230. The flash point is between about 110° and 125°C. The viscosity is between 2.5° and 3.5° Engler. At normal pressure about 80 percent by volume distil at a temperature of about 340°. This mixture of substances may be added alone or together with the above-mentioned polymerization inhibitors.

The result of this step is that the aqueous solution of the alkali metal salts of amino acids is prevented from foaming and that the polymerization of the readily polymerizable compounds contained in the gases is inhibited.

The process is carried out at normal or elevated pressure, preferably within the region of 5 to 50 ats, particularly between 15 and 35 ats. The process may be carried out in one stage or in several stages.

The hydrocarbon mixture for treating the aqueous solution should have a density between 0.825 and 0.885 at 15°C. It consists substantially of benzene, toluene, the xylenes, ethyl benzene and the methyl ethyl benzenes. It is preferred to use a hydrocarbon mixture that contains 60 to 90 percent by weight of aromatics having six to nine carbon atoms in the molecule. The presence of minor quantities, for instance up to a total of about 5 percent by weight, of polymerizable compounds, such as styrene, cyclopentadiene or methyl styrene is not objectionable in the proposed process. Moreover, the mixture may contain non-aromatic hydrocarbons having from seven to about 12 carbon atoms in the molecule, in quantities up to 35 percent by weight.

The treatment of the aqueous solution of the alkali metal salts of amino acids with the hydrocarbon mixture may be carried out immediately after the $CO_2$ and/or $H_2S$ has been absorbed (charged solution) or the $CO_2$ and/or $H_2S$ has been stripped (regenerated solution). Preferably the aqueous solution of alkali metal salts of amino acids that is to be purified should be thoroughly mixed with the hydrocarbon mixture. The hydrocarbon treatment can be carried out at normal or elevated pressure, for instance up to 30 ats. The amount of hydrocarbon mixture that should be used depends for instance upon the treatment temperature, the quantity of polymers to be removed and the thoroughness with which the hydrocarbon mixture has been mixed with the solution that is to be purified. Generally 50 to 150 liters of the hydrocarbon mixture is used per 100 liters of the solution to be purified.

In order that the invention may be more readily understood, the drawing represents a flow sheet illustrating one embodiment of the process.

Through a pipe 1 the gas stream to be purified enters an absorption column 2. The purified gas stream leaves through a pipe 3. The regenerated solution of salts of amino acids flows through the column 2 in countercurrent and enters through a pipe 4. A pipe 5 carries the charged liquor from the column 2 through a mixer 6 in which it is mixed with the hydrocarbon mixture, which is supplied through a pipe 7. In a separating tank 8 the aqueous phase is separated from the hydrocarbon phase. The hydrocarbon mixture leaves through a pipe 9. A pipe 10 carries the solution charged with $H_2S$ and $CO_2$ through a heat exchanger 11 into a desorption column 12. In this column steam introduced through a pipe 13 into the lower part of the desorption column 12 expels the absorbed $H_2S$ and $CO_2$ as well as the hydrocarbons still dissolved in the solution. The expelled gases are withdrawn through a pipe 14. The regenerated solution is taken through a pipe 15 via a pump 16 to the heat exchanger 11 in which the solution transfers a major part of its heat to the stream of liquor flowing into the desorption column. After having passed through a cooler 17 the cooled solution returns through the pipe 4 into the absorption column 2. Instead of using the method of direct heating with steam, the desorption column 12 may be indirectly heated with steam. In this case a valve 18 is closed, and valves 19, 20 and 21 are opened. Through a pipe 22 the solution enters a boiler 23 and then returns into the column 12 through a pipe 24. In this process steam condensate is obtained in a condenser 25, some of which can be returned through a pipe 26 and a pump 27 to the head of the absorption column 2. By adding water at this point the gas stream from which the $CO_2$ and $H_2S$ has been removed can be freed from any droplets of solution it may have entrained. When direct steam heating of the column 12 is used, water is introduced through a pipe 28.

While the process according to this invention is carried out, no $C_3$–$C_5$ hydrocarbons should be allowed to condense from the crude gas in the absorption column 2. This can be readily prevented by ensuring that the gas from which the $CO_2$ and/or $H_2S$ is to be removed and which enters the column 2 through the pipe 1 is colder than the regenerated solution of the salts of amino acids entering the column 2 through the pipe 4. It has been found that if some of these hydrocarbons are allowed to condense, the elimination of the polymers from the solution of the salts of amino acids by the hydrocarbon mixture according to the invention is less good. Moreover, the formation of foam by the solution is also very much more pronounced.

The invention will be further illustrated by the following Examples.

EXAMPLE 1

1500 m³ (S.T.P.) per hour of a cracked gas substantially consisting of hydrogen, methane, ethylene, propylene, 200 ppm of $H_2S$, 50 ppm of $CO_2$, 2.2 percent by weight of butadiene and 0.4 percent by weight of propyne and propadiene are continuously introduced at a pressure of 28 ats. and a temperature of 45°C into the lower part of a plate column. At the top of the column 60 liters per hour of an aqueous solution at 50°C of the potassium salt of N-methyl-α-aminopropionic acid, having a density of 1.18, are continuously introduced at the same pressure. The gas mixture emerging overhead is almost completely free from $CO_2$ and $H_2S$. The total residual content of $CO_2$ and $H_2S$ is a mere 4 ppm. The charged solution leaves the bottom of the column through a decompression valve and flows through a mixer, in which the solution is mixed with 5 liters of a hydrocarbon mixture having a density of 0.854 at 15°C and a 70 percent content of benzene, toluene and xylenes, into an intermediate tank which is maintained at a pressure of 2 ats. After remaining in this tank for about 30 minutes the aqueous phase (charged solution) is decompressed to normal pressure and taken through a heat exchanger to the head of desorption column wherein it is freed from the $CO_2$ and $H_2S$ by heating to about 100°C. The polymer content of the aqueous phase is reduced from 2.1 g/liter to 0.45 g/liter. After having been cooled and recompressed the solution from the bottom of the desorption column is returned to the head of the first column.

If a mixture of aliphatic hydrocarbons having five to nine carbon atoms is used instead of the proposed hydrocarbon mixture, the polymer content of the aqueous phase can be reduced under otherwise identical conditions to only 1.7 g/liter.

EXAMPLE 2

1500 m³ (S.T.P.) per hour of a cracked gas substantially consisting of hydrogen, methane, ethylene, propylene, 200 ppm of $H_2S$, 50 ppm of $CO_2$, 2.2 percent by weight of butadiene and 0.4 percent by weight of propyne and propadiene are continuously introduced at a pressure of 28 ats and a temperature of 45°C into the bottom end of a plate column. 60 liters/h of an aqueous solution at 50°C of the potassium salt of N-methyl-α-aminopropionic acid having a density of 1.18 are continuously introduced at the same pressure at the top of the column. A gas mixture emerges overhead from which the $CO_2$ and the $H_2S$ has been almost completely removed. The total residual content of $CO_2$ and $H_2S$ is only 3 ppm. The charged solution is taken through a decompression valve and a heat exchanger to the head of the desorption column. The $CO_2$ and the $H_2S$ are expelled at a temperature of 103°C. The regenerated solution is withdrawn from the bottom of the desorption column and after having passed through the heat exchanger this solution is thoroughly mixed with 5 liters of hydrocarbon mixture at 55°C and at a pressure of 3 ats. The hydrocarbon mixture contains 40 percent by weight of benzene, 30 percent by weight of toluene, 20 percent by weight of $C_8$-aromatics and 10 percent by weight of $C_9$-aromatics and has a density of 0.870 at 15°C. After a separation time of 40 minutes in an intermediate tank, the aqueous phase is returned by a piston pump to the head of the absorption column. The aqueous solution has a polymer content of only 0.02 g/liter.

We claim:

1. A continuous process for the removal of $CO_2$ and/or $H_2S$ from a cracked gas containing olefins and acetylenes as obtained in the thermal cracking of gasolines, Diesel oils or crude oils at 700°C. to 950°C., which process comprises:

contacting said cracked gas between 20° and 60°C. and from atmospheric to superatmospheric pressure in an absorption zone with an aqueous scrubbing solution of at least one alkali metal salt of an amino acid, said solution having been adjusted to a density at 20°C. of 1.10 to 1.25 and said cracked gas having a temperature lower than that of said scrubbing solution; removing the absorbed $CO_2$ and/or $H_2S$ from the solution by heating the same in a desorption zone to a temperature between 95° and 110°C. and then continuously recycling the solution to said absorption zone;

contacting the aqueous scrubbing solution before entering and/or after leaving the desorption zone with a hydrocarbon mixture consisting predominately of benzene and its homologues for the purpose of removing polymer impurities including those formed from said olefins and acetylenes in said absorption zone and/or said desorption zone and contained in the aqueous solution; and separating the hydrocarbon mixture containing said polymer impurities from the recycled aqueous solution.

2. A process as claimed in claim 1 wherein the aqueous solution is contacted with said hydrocarbon mixture at a temperature of from 20° to 70°C.

3. A process as claimed in claim 1 wherein a polymerization inhibitor in a quantity of from 5 to 5000 ppm is added to the aqueous solution of alkali salts of amino acids.

4. A process as claimed in claim 1 wherein there is added to said aqueous solution a mixture of substances which is obtained as the residue in the distillation of octanols nonanols and/or decanols produced by the oxo process.

5. A process a claimed in claim 1 wherein said absorption zone is maintained at a pressure of about 5 to 50 atmospheres and the treatment with the hydrocarbon mixture is carried out at atmospheric pressure up to about 30 atmospheres.

6. A process as claimed in claim 5 wherein said absorption zone is maintained at a temperature of about 35° to 50° C. and the treatment with the hydrocarbon mixture is carried out at a temperature of about 40° to 70°C.

* * * * *

PO-1050
(5/69)

UNITED STATES PATENT OFFICE
CERTIFICATE OF CORRECTION

Patent No. 3,660,016      Dated May 2, 1972

Inventor(s) Harald John et al

It is certified that error appears in the above-identified patent and that said Letters Patent are hereby corrected as shown below:

First page, left-hand column, "Krichheim" should read
-- Kirchheim --.

First page, right-hand column,
"3,042,483   7/1962  Wolfram et al................23/2R"
should read
-- 3,042,483   7/1962   Wolfram et al................23/2R
   1,990,217   2/1935   Baehr et al..................23/2

FOREIGN PATENTS OR APPLICATIONS 1,021,546   2/1966   Great Britain................23/2  --.

Column 1, line 33, "ans" should read -- and --.

Column 3, line 52, "heat heat" should read -- heat --.

Signed and sealed this 26th day of December 1972.

(SEAL)
Attest:

EDWARD M. FLETCHER, JR.                ROBERT GOTTSCHALK
Attesting Officer                      Commissioner of Patents